US011117590B2

(12) United States Patent
Grubwinkler

(10) Patent No.: US 11,117,590 B2
(45) Date of Patent: Sep. 14, 2021

(54) METHOD AND SYSTEM FOR DETERMINING EFFECTIVE WIND SPEEDS FOR MOTOR VEHICLES

(71) Applicant: Vitesco Technologies GmbH, Hannover (DE)

(72) Inventor: Stefan Grubwinkler, Munich (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 16/755,349

(22) PCT Filed: Oct. 11, 2018

(86) PCT No.: PCT/EP2018/077802
§ 371 (c)(1),
(2) Date: Apr. 10, 2020

(87) PCT Pub. No.: WO2019/073007
PCT Pub. Date: Apr. 18, 2019

(65) Prior Publication Data
US 2021/0197837 A1    Jul. 1, 2021

(30) Foreign Application Priority Data
Oct. 12, 2017   (DE) .................. 10 2017 218 218.0

(51) Int. Cl.
*B60W 40/10*   (2012.01)
*G01P 5/02*    (2006.01)

(52) U.S. Cl.
CPC .......... *B60W 40/1005* (2013.01); *G01P 5/02* (2013.01)

(58) Field of Classification Search
CPC ............................ B60W 40/1005; G01P 5/02
See application file for complete search history.

(56) References Cited

U.S. PATENT DOCUMENTS

| | | | |
|---|---|---|---|
| 9,785,612 B2* | 10/2017 | Poechmueller | G01C 21/3469 |
| 2006/0090573 A1* | 5/2006 | Foss | G01F 1/696 73/861.85 |
| 2009/0311924 A1* | 12/2009 | Wobben | B63H 9/02 440/6 |

(Continued)

FOREIGN PATENT DOCUMENTS

| | | | | |
|---|---|---|---|---|
| DE | 102012001649 A1 | 8/2013 | | B60W 30/12 |
| DE | 102014211273 A1 | 12/2015 | | B60W 40/13 |

(Continued)

OTHER PUBLICATIONS

Translation of WO-2014037986-A1 (Year: 2014).*

(Continued)

*Primary Examiner* — Nathaniel T Woodward
(74) *Attorney, Agent, or Firm* — Slayden Grubert Beard PLLC

(57) ABSTRACT

Various embodiments include a method for determining an effective wind speed to which a vehicle is exposed while driving comprising: determining an effective mechanical drive power for the vehicle by measuring the current and voltage at an electric motor and using an efficiency characteristic diagram of the electric motor and accounting for losses in a drive train of the motor vehicle; and calculating the effective wind speed based on the effective mechanical drive power.

11 Claims, 2 Drawing Sheets

(56) References Cited

U.S. PATENT DOCUMENTS

| | | | |
|---|---|---|---|
| 2011/0071710 A1 | 3/2011 | Puig et al. ..................... | 701/14 |
| 2013/0319096 A1* | 12/2013 | Heyse ............... | B60W 40/1005 |
| | | | 73/114.68 |
| 2018/0082495 A1* | 3/2018 | Koebler ................ | B60W 10/04 |
| 2019/0135268 A1* | 5/2019 | Lee ........................ | B60K 6/442 |

FOREIGN PATENT DOCUMENTS

| | | | | |
|---|---|---|---|---|
| FR | 2909058 A1 | 5/2008 | ........... | B60R 16/023 |
| WO | WO-2014037986 A1 * | 3/2014 | ........ | B60W 40/1005 |
| WO | 2014/037986 A1 | 8/2016 | ............ | B60W 40/02 |
| WO | 2019/073007 A1 | 4/2019 | ............ | B60W 40/10 |

OTHER PUBLICATIONS

International Search Report and Written Opinion, Application No. PCT/EP2018/077802, 29 pages, dated Jan. 29, 2019.
Viehl, Alexander et al., "Wetterdaten in der Reichweitenprognose für E-Fahrzeuge," Titelthema Elektronobilität, Automobiltechnische Zeitschrift, vol. 118, No. 5, pp. 28-34 (German language w/ English abstract), Apr. 29, 2016.

\* cited by examiner

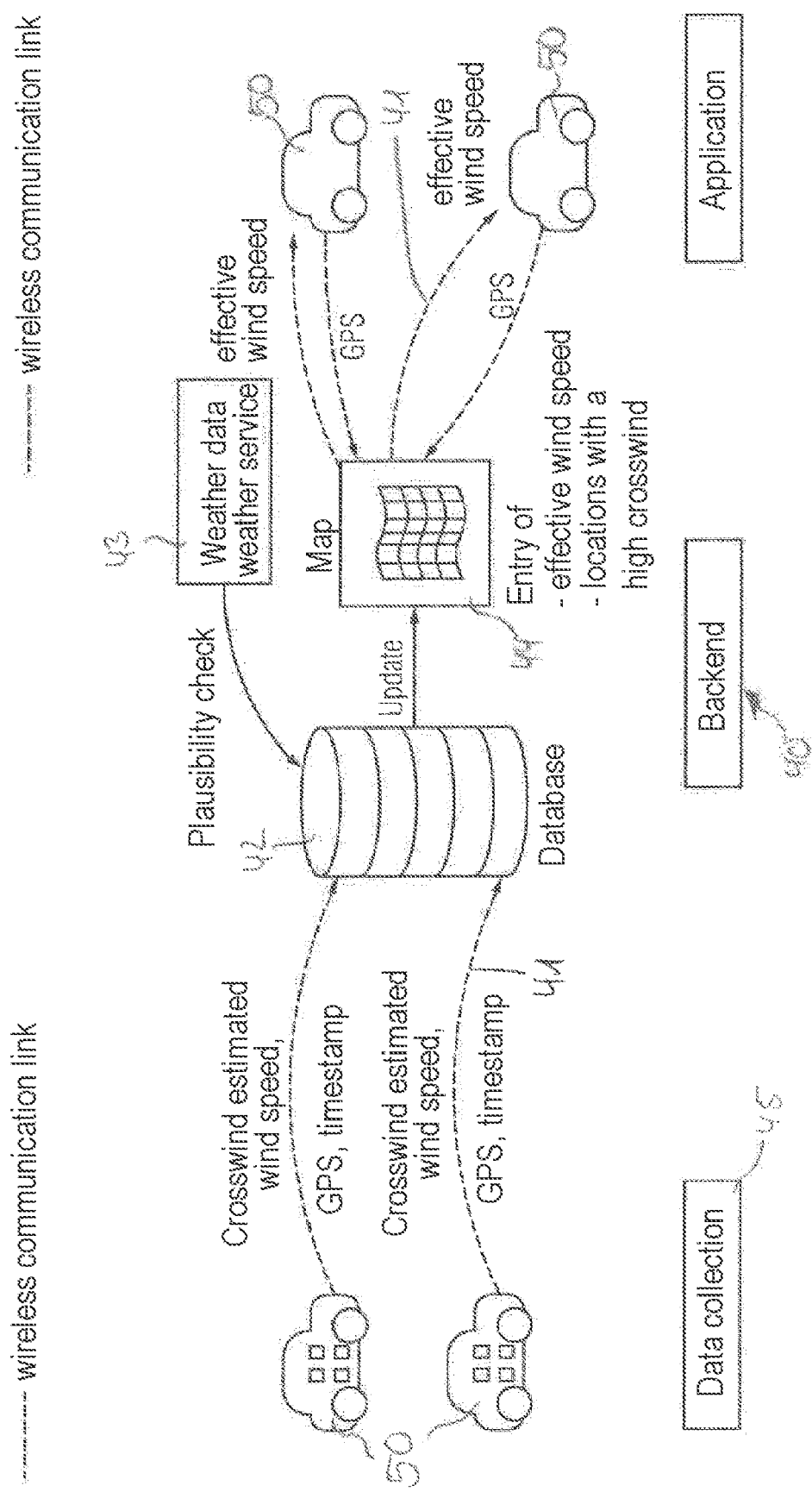

METHOD AND SYSTEM FOR DETERMINING EFFECTIVE WIND SPEEDS FOR MOTOR VEHICLES

CROSS-REFERENCE TO RELATED APPLICATIONS

This application is a U.S. National Stage Application of International Application No. PCT/EP2018/077802 filed Oct. 11, 2018, which designates the United States of America, and claims priority to DE Application No. 10 2017 218 218.0 filed Oct. 12, 2017, the contents of which are hereby incorporated by reference in their entirety.

TECHNICAL FIELD

The present disclosure relates to operating vehicles. Various embodiments may include methods and systems for determining the effective wind speed for motor vehicles, methods for collecting data regarding wind speeds, and/or databases containing data regarding wind speeds.

BACKGROUND

Electric vehicles (EVs) have a limited range, meaning that an energy consumption estimate or a range forecast is very important for the driver. For an accurate range forecast, it is necessary to know all of the influencing factors relevant to energy consumption. Due to aerodynamic drag, the wind speed has an influence on the drive energy requirement and has to be taken into account, in particular for cross-country routes.

Literature sources specify the influence of wind speed as up to 16.4% (source: Viehl, A., Cakar E., Engler M., Köhler. S: Wetterdaten in der Reichweitenprognose für Elektrofahrzeuge [Weather data in range forecasting for electric vehicles], ATZ May 2016, pp. 28-34). The energy consumption forecast requires detailed and up-to-date data from weather services with a high resolution (for example wind speed every 5 km). In the examples described, the weather data (wind speed and direction) are made available to the vehicles through a back-end connection. The wind speed acting on the airflow surface of the vehicle is determined on the basis of the direction of travel of the vehicle.

The wind speed acting on the electric vehicle is determined only insufficiently from precise weather data. Weather data provide the average wind speed and direction for a specific area, which provides a good forecast, especially for flat areas. The topography (valleys, mountains) changes the wind speed and direction significantly. Micro-climatic effects (for example evaporation) likewise have an influence on the wind speed and are difficult to forecast. In addition, developments and vegetation (for example forests) along the route have a significant influence on the effective wind speed acting on the vehicle. In addition, roads are often provided with walls on both sides for noise protection reasons, meaning that the forecasts from weather services are not correct for the conditions on the road.

DE 102012001649 A1 describes a method and a device for determining the speed of the crosswind acting on a motor vehicle by way of a sensor system internal to the vehicle. DE 102014211273 A1 describes a vehicle mass estimation method.

SUMMARY

Against this background, the teachings of the present disclosure may be used to improve the forecast of the effective wind speed acting on the vehicles. For example, some embodiments include a method for determining (30) an effective wind speed (W) to which a vehicle (50) is exposed while driving, on the basis of an effective drive power.

In some embodiments, the effective drive power ($P_m$) of the vehicle (50) is determined while driving (10).

In some embodiments, the vehicle (50) has an electric drive motor, and the effective mechanical drive power ($P_m$) while driving is determined by measuring current and voltage on the electric drive motor driving the vehicle.

In some embodiments, the wind speed (W) effectively acting on the vehicle is calculated from an air resistance, which is calculated (20) by subtracting known and/or estimated driving resistances from the effective drive power (10).

In some embodiments, data from a sensor system internal to the vehicle, surroundings sensor system of the vehicle, position data of the vehicle, data from digital maps, infrastructure data, data received from other vehicles and/or data received from a backend are used to calculate the air resistance (20).

In some embodiments, overtaking maneuvers and/or vehicles driving in front are detected (14) by way of a surroundings sensor system, a sensor system internal to the vehicle and/or vehicle-to-vehicle communication.

In some embodiments, a quality (31) of the determined air resistance (21) or of the determined effective wind speed (W) is determined on the basis of the data that are used.

In some embodiments, the determined effective wind speed (W) is transmitted from the vehicle to a backend (40) via a wireless communication link (41).

In some embodiments, wind speeds are determined taking into account sensor data collected from networked vehicles (50) while driving, and stored in a database (42).

In some embodiments, the data regarding wind speeds are effective wind speeds (W) that have been determined using a method as described above.

In some embodiments, the wind speeds concern crosswinds that are determined (32) by appropriate sensors on motor vehicles while driving.

In some embodiments, the data regarding wind speeds, which were determined on the basis of drive powers and/or sensor data recorded by a plurality of vehicles, are collected, stored and evaluated using statistical methods and/or using artificial intelligence methods.

As another example, some embodiments include a database (42) containing data regarding wind speeds that were determined, collected and/or evaluated using a method as claimed in one of the preceding claims.

As another example, some embodiments include a digital map (44) containing data regarding wind speeds that were determined, collected and/or evaluated using a method as described above.

As another example, some embodiments include a method for transmitting data regarding wind speeds from a database or a digital map as described above to at least one networked vehicle (50) via a wireless communication link (41).

As another example, some embodiments include a system for determining wind speeds to which a motor vehicle (50) is exposed while driving, having a sensor arrangement for recording surroundings data, vehicle data and/or the occurrence of crosswinds; a communication device for receiving (41) position data, infrastructure data, data from a digital map and/or data transmitted from other vehicles or from a backend; a communication device for transmitting (41) wind speeds calculated in the motor vehicle or data recorded in the motor vehicle for calculating a wind speed to a backend (40); and a computer unit for calculating an effective wind speed (W) on the basis of the data recorded and/or received in the motor vehicle (50), wherein the computer unit may be arranged in the motor vehicle (50) or in the backend (40).

BRIEF DESCRIPTION OF THE DRAWINGS

In the figures, schematically:

FIG. 2 shows an overview application of the wind speeds determined using the method shown in FIG. 1 and of the components involved.

DETAILED DESCRIPTION

Figure 1:
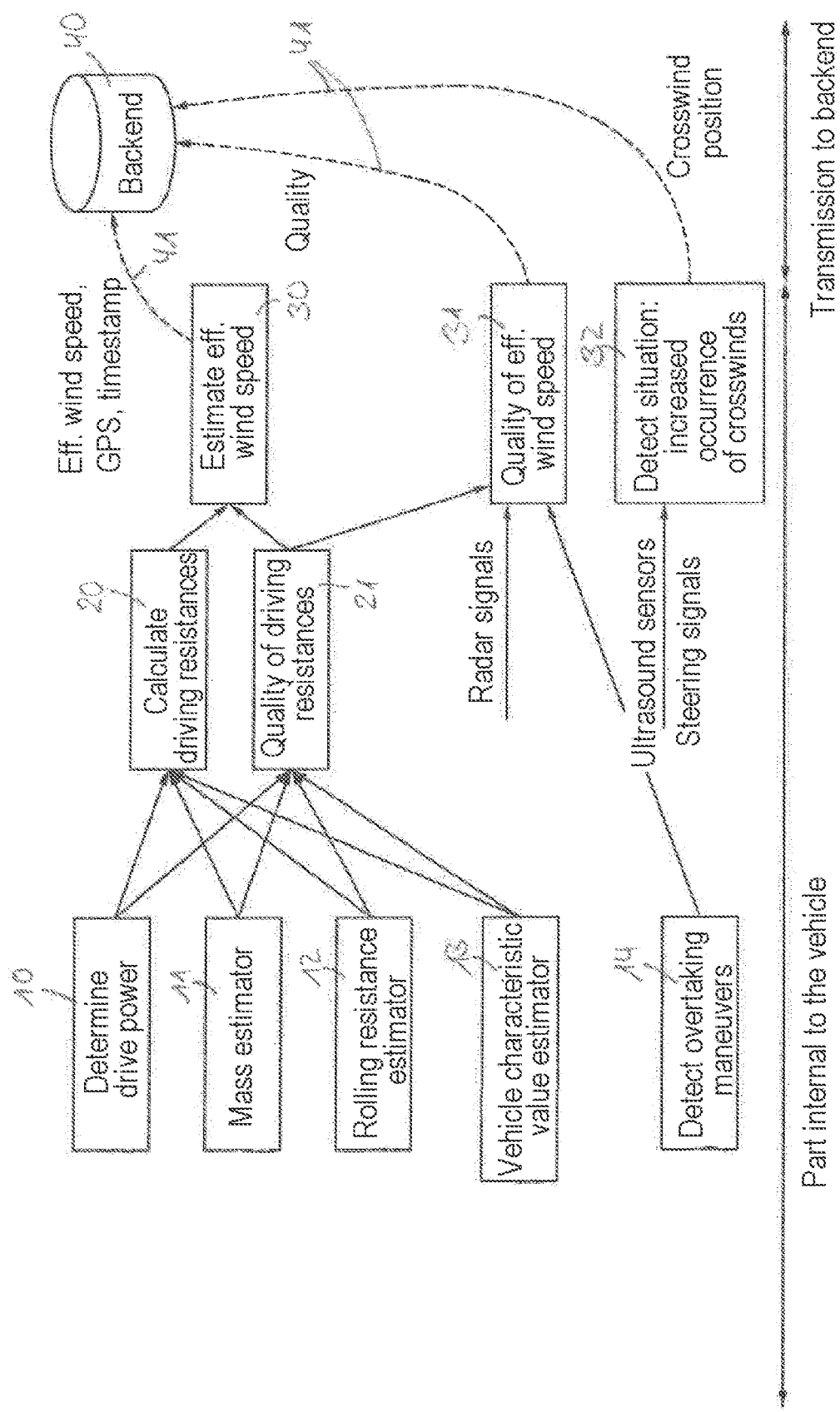
FIG. 1 shows an overview of a method for determining the effective wind speed incorporating teachings of the present disclosure.

Some embodiments include a method for determining an effective wind speed to which a motor vehicle is exposed while driving, on the basis of an effective drive power. The effective drive power of the motor vehicle is preferably determined while driving.

The methods may be used in electric vehicles, that is to say in vehicles that have an electric drive motor. In electric vehicles, the effective mechanical drive power $P_m$ may be precisely determined by measuring the current and voltage at the electric motor if the efficiency characteristic diagram of the electric motor and the losses in the drive train of the motor vehicle (for example in the transmission, etc.) are known. This is generally the case for series production vehicles.

Since the drive train with an electric drive motor also usually does not have to be interrupted by a multi-speed transmission, there is the further advantage that the drive power of the electric motor is generally able to be determined continuously and is able to be recorded continuously by sensors and control devices internal to the vehicle while driving. The effective mechanical drive power $P_m$ generally corresponds to the power required to overcome the driving resistances:

$$P_m = (F_a + F_l + F_{st} + F_r) * V$$

Driving resistances include acceleration resistance $F_a$ (depending on vehicle mass, mass surcharge factor and acceleration), gradient resistance $F_{st}$ (depending on vehicle mass and gradient of the road) and rolling resistance $F_r$ (depending on vehicle mass and rolling resistance coefficient) and air resistance:

$$F_l = \frac{1}{2} * \rho * c_w * A * (v-W)^2.$$

The air resistance $F_l$ depends on the vehicle characteristic value $c_w*A$, the vehicle speed v and the effective wind speed W. A is the effective vehicle cross-sectional area (perpendicular to the direction of travel). $\rho$ is the air density.

In some embodiments, the wind speed W effectively acting on the vehicle is therefore calculated from the effective air resistance $F_l$. The air resistance is in turn calculated by subtracting known and/or estimated driving resistances from the effective drive power $P_m$. The effective wind speed W acting on the vehicle, which may be determined using the method described above, relates in this case in particular to the components of the wind speed acting in the direction of travel or counter to the direction of travel. Wind components transverse (that is to say perpendicular) to the direction of travel, what are known as crosswinds, are therefore not recorded.

Known driving resistances are the abovementioned driving resistances, the input variables of which are fixed and known or able to be measured. Some of said input variables are changeable and are not easily able to be measured, such as for example the vehicle mass, which changes depending on the extra load and the number of people carried. All vehicle parameters not able to be measured may be estimated using methods that are known. For this purpose, the vehicle mass may be estimated using a known mass estimator, the rolling resistance coefficient and the vehicle characteristic value (changes for example with open windows or with roof luggage).

Filter methods, for example Kalman filters, and least squares estimation methods are suitable for example as estimation methods for the individual parameters. The measured vehicle dynamic variables (speed, acceleration), the vehicle parameters and estimates at past times are used as input variables for the estimation methods. The corresponding driving resistances may then be estimated from the estimated vehicle parameters. The estimation methods also provide information about the quality of the estimated value. Data from a sensor system internal to the vehicle, surroundings sensor system of the vehicle, position data of the vehicle, data from digital maps, infrastructure data, data received from other vehicles and/or data received from a backend may be used to calculate the air resistance.

If precise gradient data are available, for example using digital maps together with position data of the vehicle, all of the input parameters for the driving resistances with the exception of the wind speed are known. This allows the wind speed to be calculated or estimated. A suitable filtering approach is also suitable for this purpose (e.g. Kalman filter or least squares estimator).

The other estimated variables (mass, rolling resistance coefficient and vehicle characteristic value) do not change as dynamically as the wind speed, meaning that the adjustment speed of the wind speed estimator is faster than that of the other filters. The individual filters may be combined with one another such that, when the estimated mass value changes, for example, the quality of the determined wind speed is reduced and possibly marked as not valid.

In some embodiments, a quality of the determined air resistance or of the determined effective wind speed is therefore additionally determined on the basis of the data that are used. The quality in this case indicates how reliable the determined value is.

In some embodiments, overtaking maneuvers and/or vehicles driving in front of the motor vehicle are detected by way of a surroundings sensor system, a sensor system internal to the vehicle and/or vehicle-to-vehicle communication. By way of example, radar sensors may be used to determine whether the vehicle is driving behind another vehicle, in particular behind a truck. Overtaking maneuvers may also be determined using sensors internal to the vehicle. For example, certain steering movements, turning signals and acceleration values may indicate an overtaking maneuver. The quality of the wind speed determined during overtaking maneuvers and when following behind trucks is preferably reduced, since the values determined for the effective wind speed are able to be used only to a limited extent in these driving situations.

In some embodiments, the effective wind speed (on the road) acting on a motor vehicle is determined based on location. That is to say, the effective wind speed at a particular location is determined. Since the method may be carried out continuously while driving, it is possible to determine the wind speed and its changes along a route being traveled. In this case, that influence of the wind speed that is relevant to the energy consumption forecast is determined. The effective wind speed therefore concerns the respective wind component in the direction of travel or counter to the direction of travel. A separate evaluation of the wind direction is not absolutely necessary, since the effective wind speed applies for a particular road section in a georeferenced manner.

Crosswinds, that is to say wind components perpendicular to the direction of travel of the vehicle, may also be detected via appropriate sensors, for example ultrasound sensors on the vehicle. Steering signals, for example from a steering angle sensor, may also be used to detect crosswinds, for example when strong crosswinds make constant counteractive steering necessary. The actual calculation of the effective wind speed W may be carried out by a computer unit in the vehicle on the basis of the data determined, estimated or received in the vehicle. The effective wind speeds determined in the vehicle may be transmitted from the vehicle to a backend via a wireless communication link. In this case, the spatial positions of the vehicle and/or a quality and/or time information may be additionally transmitted to the backend. That is to say, the determined effective wind speeds are georeferenced and transmitted to the backend with a timestamp. The backend may in this case be formed by a central server, for example, but also by a cloud.

In some embodiments, only the specific vehicle data (sensor data, drive power, geoposition) required to calculate the effective wind speeds are transmitted from the vehicle to the backend. The actual calculation of the effective wind speed may then likewise be carried out by a computer unit in the backend. Any necessary estimation procedures may also be carried out in the backend.

Some embodiments include methods for collecting and storing data regarding wind speeds, which were determined taking into account sensor data and/or drive powers collected from a plurality of vehicles while driving, in a database. The data regarding wind speeds may correspond to the effective wind speeds calculated using the above-described method. In some embodiments, data regarding crosswinds, recorded by appropriate sensors on the vehicle, may however also be collected and stored. In the same way as a determined effective wind speed, a recorded crosswind speed with geoposition and timestamp may be transmitted from the vehicle to the backend for this purpose.

The collected values regarding wind speeds, which were determined on the basis of the drive powers and/or sensor data recorded by a plurality of vehicles, may be evaluated in the backend using statistical methods and artificial intelligence methods. This applies to both effective wind speeds and crosswind speeds. The effective wind speeds are in this case preferably treated separately according to the direction of travel.

Average values or a most probable value for an effective wind speed at a particular location may be determined for the effective wind speed and crosswind speed. These average values or most probable values may additionally be checked for plausibility using data from weather services. In addition to the average values and the most probable values, locations with strong wind, in particular with increased occurrence of crosswinds, may also in particular be identified. In addition, the evaluation of the wind speeds may also serve as a basis for a forecast of future wind speeds.

Some embodiments include databases containing data regarding wind speeds that have been determined, collected and/or evaluated using the methods described above. The database may be implemented in the backend and may contain georeferenced values regarding wind speeds. In addition to the collected and stored values regarding wind speeds, the database may also contain average values or most probable values for wind speeds at a particular location, these values being obtained by evaluating data from a plurality of networked vehicles. These may be values for the effective wind speed (in the direction of travel or counter thereto) that were determined on the basis of the drive power of vehicles. In some embodiments, values for occurrences of crosswinds may however also be collected in the database.

In some embodiments, the database may also be implemented in the form of a digital map, wherein the collected and/or evaluated values for wind speeds are assigned to the spatial positions in a road network in a georeferenced manner. Navigation devices in vehicles are for example able to access such a digital map through wireless communication. The information, stored in the database or in the digital map, of networked vehicles may accordingly be made available via a wireless communication link for various services, for example for range estimation and energy consumption forecasting for electric vehicles.

Information, stored in the database or the digital map, regarding occurrences of crosswinds (in particular at locations with an increased occurrence of crosswinds) may be made available to all networked vehicles (including conventional vehicles driven by internal combustion engines), in order for example to issue warnings to the driver or for the parameterization of a lane keep assistance system or for consideration when planning the lane of autonomous or partly autonomous vehicles.

Some embodiments include a system for determining wind speeds to which a motor vehicle is exposed while driving, having:
  a sensor arrangement for recording surroundings data, vehicle data and/or the occurrence of crosswinds;
  a communication device for receiving position data, infrastructure data, data from a digital map and/or data transmitted from other vehicles or from a backend;
  a communication device for transmitting wind speeds calculated in the vehicle or data recorded in the motor vehicle for calculating a wind speed to a backend; and
  a computer unit for calculating an effective wind speed on the basis of the data recorded and/or received in the motor vehicle, wherein the computer unit may be arranged in the motor vehicle or in the backend.

The system for determining wind speeds to which a motor vehicle is exposed while driving may be configured so as to perform the methods described above for determining an effective wind speed. The systems described herein make it possible to determine the wind speed effectively acting on the vehicles independently of the average values of weather forecasts. This information about the wind speeds effectively acting on the vehicles may be collected and evaluated in a cloud or in a backend. The data thus collected and processed may then be made available to other vehicles. The invention is thus suitable for allowing an improved energy consumption and range forecast in electric or hybrid vehicles. In addition, the information about wind speeds and in particular also about crosswinds may be made available to driver assistance systems such as for example lane keep assistants or to autonomous and partly autonomous vehicles, and thus increase driving safety.

In principle, the methods described herein for determining the effective wind speed is also useful for vehicles driven by internal combustion engines or hybrid vehicles. However, use in electric vehicles is simplified since the effective drive power is able to be determined particularly well. The data that are determined may be used beneficially for all types of motor vehicle.

The teachings are explained in more detail below by way of example with reference to FIGS. 1 and 2. FIG. 1 shows, by way of example, an overview of an example method for determining an effective wind speed using the example of an electric vehicle.

In step 10, the drive power of the vehicle is determined on the basis of signals relating to the longitudinal dynamics of the vehicle. In this case, the drive power that is produced by the electrical machine may be determined on the basis of current and the voltage in the electrical machine. This power may be corrected with regard to the power loss in the drive train.

In addition to the drive power of the vehicle, the driving resistances may be determined or estimated (step 20). For this purpose, the vehicle mass is estimated in step 11 using a mass estimator on the basis of signals of the longitudinal and transverse dynamics, speed and acceleration values. A rolling resistance may also be estimated from said signals in step 12 and a vehicle characteristic value may be estimated in step 13. In addition, overtaking maneuvers may be detected in step 14 on the basis of signals from the steering system, vehicle pedals, turn signals, speed and acceleration values. The determined or estimated values regarding vehicle mass, rolling resistance and vehicle characteristic value are included in the calculation of the driving resistances in step 20. Since the values estimated in steps 11 to 13 are subject to a certain degree of uncertainty, the driving resistances calculated therefrom are also impacted by a certain error or have a certain quality 21.

On the basis of the drive power determined in step 10 and the driving resistances calculated in step 20, the effective wind speed W in the direction of travel or counter thereto may now be estimated in step 30. Depending on the quality of the output data and driving resistances 21, the estimate of the effective wind speed 30 also has a certain quality 31. The quality of the effective wind speed additionally includes information from a radar sensor as to whether a vehicle in front (for example a truck) has possibly been detected. Overtaking maneuvers that may have been recorded in step 14 also affect and reduce the quality 31 of the estimated wind speed.

In addition, in step 32, crosswinds perpendicular to the direction of travel may be detected on the basis of ultrasound sensors on the vehicle or on the basis of steering signals. The values thus determined regarding the effective wind speed and the quality of the determined value, as well as any crosswinds that may have been detected, are then transmitted to a backend 40 together with a geoposition (for example determined via GPS or another navigation satellite system) and a time specification/a timestamp via wireless communication 41.

FIG. 2 shows the data collection of the effective wind speeds (and possibly crosswind speeds) by a plurality of networked vehicles 50. The wind speeds determined using the method described above are transmitted to the backend 40 via a wireless communication link 41. The data are stored there together with the associated location data in a database 42. The received and stored data are evaluated using statistical methods or artificial intelligence methods by way of a computer unit in the backend 40.

Average values and most probable values may in particular be determined, and forecasts for future wind speeds may be made. The evaluated wind speeds may be checked for plausibility on the basis of weather data 43 received from a weather service. The wind speeds thus determined and checked for plausibility (effective wind and crosswind) are then entered in a digital map 44 and may thus be assigned to a road network. If new data regarding wind speeds are transmitted continuously from networked vehicles to the backend, the database and in particular the digital map may be updated continuously or regularly.

The location-related information, thus obtained and stored in the digital map, regarding wind speeds may then in turn be made available to other networked vehicles 50. These may transmit a query to the backend or a digital service via wireless communication 41, wherein the query preferably contains location or route information. On the basis of the received location-related query, the backend may then transmit location-related information regarding the wind speeds stored in the digital map to the networked vehicle 50.

In the networked vehicles 50, the information thus received about wind speeds along the route may be used for various functions. Examples of functions include driver assistance systems, lane keep assistants, warnings to the driver regarding wind speeds, energy consumption forecasts, range forecasts, and others. In the context of the present disclosure, the term "GPS" is intended to represent all global navigation satellite systems (GNSS), such as for example GPS, Galileo, GLONASS, Compass or IRNSS. A position of the vehicle may furthermore also be determined via cell positioning. This is possible, in particular, when using GSM, UMTS or 4G networks.

What is claimed is:

1. A method for determining an effective wind speed to which a vehicle is exposed while driving, the method comprising:
   determining an effective mechanical drive power for the vehicle by measuring the current and voltage at an electric motor and using an efficiency characteristic diagram of the electric motor and accounting for losses in a drive train of the motor vehicle; and
   calculating the effective wind speed based on the effective mechanical drive power.

2. The method as claimed in claim 1, further comprising determining the effective drive power of the vehicle while underway.

3. The method as claimed in claim 1, wherein calculating the wind speed acting on the vehicle includes determining an air resistance by subtracting known and/or estimated driving resistances from the effective drive power.

4. The method as claimed in claim 1, wherein calculating the air resistance depends at least in part on at least one factor from the group consisting of: data from a sensor system internal to the vehicle, surroundings sensor system of the vehicle, position data of the vehicle, data from digital maps, infrastructure data, data received from other vehicles and/or data received from a backend.

5. The method as claimed in claim 1, further comprising detecting overtaking maneuvers and/or vehicles driving in front with a surroundings sensor system, a sensor system internal to the vehicle, and/or vehicle-to-vehicle communication.

6. The method as claimed in claim 1, further comprising determining
   a quality of the determined air resistance or of the determined effective wind speed on the basis of the data used.

7. The method as claimed in claim 1, further comprising transmitting the determined effective wind speed from the vehicle to a backend via a wireless communication link.

8. The method as claimed in claim 1, further comprising storing said data in a database.

9. The method as claimed in claim 8, wherein the wind speeds relate to crosswinds determined by appropriate sensors on motor vehicles while in operation.

10. The method for collecting data regarding wind speeds as claimed in claim 8, wherein the data regarding wind speeds are collected, stored, and evaluated using statistical methods and/or using artificial intelligence methods.

11. A system for determining wind speeds to which a motor vehicle is exposed while driving, the system comprising:
- a sensor arrangement for recording surroundings data, vehicle data including current and voltage at an electric motor of the motor vehicle, and/or the occurrence of crosswinds;
- a communication device for receiving position data, infrastructure data, data from a digital map, and/or data transmitted from other vehicles or a backend;
- the communication device also transmitting wind speeds calculated in the motor vehicle or data recorded in the motor vehicle for calculating a wind speed to the backend;
- and a processor for calculating an effective wind speed acting on the motor vehicle on the basis of the data recorded and/or received and an efficiency characteristic diagram of the electric motor.

* * * * *